United States Patent
Li et al.

(10) Patent No.: US 12,432,112 B2
(45) Date of Patent: Sep. 30, 2025

(54) METHOD AND APPARATUS FOR TRIGGERING vOMCI FUNCTION FROM OLT TO SEND OMCI MESSAGES

(71) Applicant: Nokia Solutions and Networks Oy, Espoo (FI)

(72) Inventors: Jian Li, Shanghai (CN); Xin Wang, Shanghai (CN); Erik Duys, Antwerp (BE); Ilias Gravalos, Kifisia (GR); Jie Liu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 411 days.

(21) Appl. No.: 17/576,083

(22) Filed: Jan. 14, 2022

(65) Prior Publication Data

US 2022/0231907 A1 Jul. 21, 2022

(30) Foreign Application Priority Data

Jan. 15, 2021 (CN) .......................... 202110055845.0

(51) Int. Cl.
*H04L 41/0806* (2022.01)
*H04B 10/27* (2013.01)

(52) U.S. Cl.
CPC ......... *H04L 41/0806* (2013.01); *H04B 10/27* (2013.01)

(58) Field of Classification Search
CPC . H04L 41/0806; H04L 41/0213; H04L 41/04; H04L 41/0803; H04L 67/10;

(Continued)

(56) References Cited

U.S. PATENT DOCUMENTS

| 8,121,479 B2 * | 2/2012 | Effenberger | ........ H04J 14/0252 |
| | | | 398/43 |
| 9,032,209 B2 * | 5/2015 | Effenberger | .......... H04L 9/3271 |
| | | | 398/58 |

(Continued)

FOREIGN PATENT DOCUMENTS

| CN | 102710999 A | 10/2012 |
| CN | 104243206 A | 12/2014 |

(Continued)

OTHER PUBLICATIONS

Extended European Search Report dated Jun. 14, 2022, issued in corresponding European Patent Application No. 22151863.2.

(Continued)

*Primary Examiner* — Dady Chery
(74) *Attorney, Agent, or Firm* — Harness, Dickey & Pierce, P.L.C.

(57) ABSTRACT

The present disclosure provides a method and apparatus for triggering vOMCI function from OLT to send OMCI messages. the method comprises: generating a content message that needs to be sent to ONU based on OMCI protocol; obtaining an ONU list corresponding to the content message, and sending the content message and the ONU list to vOLTMF or vOMCI function deployed in a cloud server; receiving an OMCI message sent by the vOMCI function, and sending the OMCI message to corresponding ONU, wherein the OMCI message is generated by the vOMCI function according to the content message. This disclosure provides a mechanism for triggering vOMCI function from OLT to send OMCI messages to ONU for the content messages that are generated in the OLT and need to be sent to the ONU based on the OMCI protocol.

11 Claims, 6 Drawing Sheets

(58) Field of Classification Search
CPC ........... H04B 10/27; H04Q 2011/0088; H04Q 11/0067; H04Q 11/0071; H04Q 2011/0079; H04Q 11/0062
See application file for complete search history.

(56) References Cited

U.S. PATENT DOCUMENTS

| | | | |
|---|---|---|---|
| 9,270,480 B1 * | 2/2016 | Som de Cerff | ....... H04L 41/344 |
| 2011/0029773 A1 | 2/2011 | Effenberger | |
| 2015/0215033 A1 | 7/2015 | Lin et al. | |
| 2019/0306018 A1 * | 10/2019 | Steverson | ........... H04L 41/0806 |

FOREIGN PATENT DOCUMENTS

| | | |
|---|---|---|
| CN | 111901705 A | 11/2020 |
| EP | 3869768 A1 | 8/2021 |
| WO | WO-2017/177619 A1 | 10/2017 |
| WO | WO-2020/083289 A1 | 4/2020 |
| WO | 2020/233465 A1 | 11/2020 |

OTHER PUBLICATIONS

Office Action for Chinese Application No. 202110055845.0 dated Mar. 26, 2024.
Second Office Action for Chinese Application No. 202110055845.0 dated Aug. 30, 2024.
Chinese Decision of Rejection dated Nov. 29, 2024 for corresponding Chinese Patent Application No. 202110055845.0.

* cited by examiner

METHOD AND APPARATUS FOR TRIGGERING vOMCI FUNCTION FROM OLT TO SEND OMCI MESSAGES

CROSS-REFERENCE TO RELATED APPLICATIONS

This application claims priority to and the benefit of Chinese Patent Application No. 202110055845.0 filed on Jan. 15, 2021, the entire contents of each of which are incorporated herein by reference.

TECHNICAL FIELD

The present disclosure relates to the field of passive optical network technologies, and in particular, to a technical scheme for triggering vOMCI (virtual OMCI) function from OLT (Optical Line Terminal) to send OMCI (Optical Network Unit Management and Control Interface) messages.

BACKGROUND

OMCI is a configuration transmission channel defined in a GPON (Gigabit-Capable Passive Optical network) standard, and is used for management and control of ONT (Optical Network Terminal) (also referred to as ONU or optical network unit) by OLT (Optical Line Terminal) in the GPON network.

In the prior art, the OMCI protocol stack is deployed in OLT. The WT-451 is discussing the vOMCI function, which will move the OMCI protocol stack out of the OLT device and deploy it in the cloud, and since the contents of most of the MEs (Managed Entities) supported by the OMCI protocol are directly from the configuration of the operators, by deploying the OMCI protocol stack in the cloud, the OMCI configuration message can be directly generated from the cloud, thereby reducing the complexity of the OLT device and improving the flexibility of different operators to deploy the OMCI protocol stack.

As discussed in WT-451, vOLTMF (vOLT Management Function) has the configuration of ONU, vOLTMF will send the configuration to vOMCI function when OLT detects an ONU, i.e. the OMCI is triggered by interface MvOLTMF-vOMCI between vOLTMF and vOMCI function, the messages transmitted on MvOLTMF-vOMCI use YANG model encoded by JSON and annotated with ONU device or vOMCI function instance name and other information as needed.

SUMMARY

The object of the present disclosure is to provide a method and apparatus for triggering vOMCI function from OLT to send OMCI messages.

According to one aspect of the present disclosure, there is provided a method for triggering vOMCI function from OLT to send OMCI messages, which is applied to an OLT, wherein the method comprises:
  generating a content message that needs to be sent to ONU based on OMCI protocol;
  obtaining an ONU list corresponding to the content message, and sending the content message and the ONU list to vOLTMF or vOMCI function deployed in a cloud server;
  receiving an OMCI message sent by the vOMCI function, and sending the OMCI message to corresponding ONU, wherein the OMCI message is generated by the vOMCI function according to the content message.

According to another aspect of the present disclosure, there is provided a method for triggering vOMCI function from OLT to send OMCI messages, which is applied to vOMCI function deployed in a cloud server, wherein the method comprises:
  obtaining content message corresponding to each ONU, wherein the content message is generated by an OLT and needs to be sent to each ONU based on OMCI protocol, the vOMCI function or vOLTMF deployed in a cloud server executes the operation of distributing the content message to each ONU;
  generating, for each ONU, an OMCI message to be sent to the ONU according to the content message corresponding to the ONU, and sending the OMCI message to the OLT.

According to another aspect of the present disclosure, there is provided a method for triggering vOMCI function from OLT to send OMCI messages, which is applied to vOLTMF deployed in a cloud server, wherein the method comprises:
  receiving a content message that needs to be sent to ONU based on OMCI protocol and an ONU list corresponding to the content message sent by an OLT;
  checking the ONU list, and distributing the content message to each ONU;
  sending the content message corresponding to each ONU to vOMCI function deployed in a cloud server.

According to another aspect of the present disclosure, there is provided a first apparatus for triggering vOMCI function from OLT to send OMCI messages, which is applied to the OLT, wherein the first apparatus comprises:
  means for generating a content message that needs to be sent to ONU based on OMCI protocol;
  means for obtaining an ONU list corresponding to the content message, and sending the content message and the ONU list to vOLTMF or vOMCI function deployed in a cloud server;
  means for receiving an OMCI message sent by the vOMCI function, and sending the OMCI message to corresponding ONU, wherein the OMCI message is generated by the vOMCI function according to the content message.

According to another aspect of the present disclosure, there is provided a second apparatus for triggering vOMCI function from OLT to send OMCI messages, which is applied to vOMCI function deployed in a cloud server, wherein the second apparatus comprises:
  means for obtaining content message corresponding to each ONU, wherein the content message is generated by an OLT, the vOMCI function or vOLTMF deployed in a cloud server executes the operation of distributing the content message to each ONU;
  means for generating, for each ONU, an OMCI message to be sent to the ONU according to the content message corresponding to the ONU, and sending the OMCI message to the OLT.

According to another aspect of the present disclosure, there is provided a third apparatus for triggering vOMCI function from OLT to send OMCI messages, which is applied to vOLTMF deployed in a cloud server, wherein the third apparatus comprises:
  means for receiving a content message that needs to be sent to ONU based on OMCI protocol and an ONU list corresponding to the content message sent by an OLT;

means for checking the ONU list, and distributing the content message to each ONU;

means for sending the content message corresponding to each ONU to vOMCI function deployed in a cloud server.

Compared with the prior art, the present disclosure has the following advantages: by using the interface between OLT and vOLTMF, and the interface between vOLTMF and vOMCI function, or using the interface between OLT and vOMCI function, a content message generated at the OLT side can be sent to the vOMCI function to trigger the vOMCI function to generate corresponding OMCI message according to the content message and send the OMCI message to corresponding ONU, therefore, for the content messages that are generated in the OLT and need to be sent to ONU based on OMCI protocol, a mechanism for triggering vOMCI function from OLT to send OMCI messages to ONU is provided.

BRIEF DESCRIPTION OF THE DRAWINGS

Other features, objectives, and advantages of the present disclosure will become more apparent through reading the following detailed depiction of the non-limitative embodiments with reference to the accompanying drawings.

Same or similar reference numbers in the drawings represent the same or similar components.

DETAILED DESCRIPTION

Figure 1:
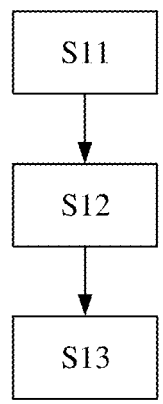
FIG. 1 shows a flowchart of a method for triggering vOMCI function from OLT to send OMCI messages according to an embodiment of the present disclosure.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be rearranged. The processes may be terminated when its operations are completed, but may also have additional steps not included in the figure. The processes may correspond to methods, functions, procedures, subroutines, subprograms, etc.

The "device" mentioned in this context refers to the smart electronic device that can carry out numerical computations and/or logical computations and other predetermined processing procedures through running predetermined programs or instructions, and may comprise a processor and a memory. It is by the processor that the program instructions prestored in the memory are executed to carry out the predetermined processing procedures, or by Application Specific Integrated Circuit (ASIC), Field Programmable Gate Array (FPGA), Digital Signal Processor (DSP) and other like hardware that the predetermined processing procedures are carried out, or some combination of the two mentioned scenarios.

The methods (some of which are showed by flowcharts) discussed infra may be implemented through hardware, software, firmware, middleware, microcode, hardware description language or any combination thereof. When they are implemented with software, firmware, middleware or microcode, the program code or code segment for executing essential tasks may be stored in a machine or a computer readable medium (e.g., storage medium). (One or more) processors may implement essential tasks.

The specific structures and function details disclosed here are only representative, for a purpose of describing the exemplary embodiments of the present disclosure. The present disclosure, however, may be specifically implemented through many alternative embodiments, and should not be construed as limited to only the embodiments illustrated here.

It will be understood that although terms "first," "second" might be used here to describe respective units, these units should not be limited by these terms. Use of these terms is only for distinguishing one unit from another. For example, without departing from the scope of the exemplary embodiments, the first unit may be referred to as the second unit, and similarly the second unit may be referred to as the first unit. The term "and/or" used here includes any and all combinations of one or more associated items as listed.

The terms used here are only for describing preferred embodiments, not intended to limit exemplary embodiments. Unless otherwise indicated, singular forms "a" or "one" used here further intends to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

It is found in this disclosure that, according to the current discussion in WT-451, only considering that OMCI is triggered by the interface MvOLTMF-vOMCI between the vOLTMF and vOMCI function, however, some OMCI messages need to be triggered from OLT, the content of which is generated in the OLT, for example, the content of a time status OMCI message is not a configuration, the message is used to provide status and characterization information for the time transmitting node and its master node, its content is generated in the OLT, but there is no mechanism in WT-451 at present to trigger vOMCI function from OLT to send OMCI to ONU.

For the OMCI messages triggered from OLT, this disclosure provides a mechanism for triggering vOMCI function from OLT to send OMCI messages to the ONU. It should be noted that, said "triggering vOMCI function from OLT to send OMCI messages" described in this disclosure means that OLT sends the content message generated by the OLT to the vOMCI function, to trigger the vOMCI function to generate corresponding OMCI message according to the content message and send the OMCI message to corresponding ONU. In some embodiments, the operation of the OLT sending the content message generated by the OLT to the vOMCI function may be initiated by the OLT actively, or may be initiated by the OLT based on a management command sent by a management device (such as, vOLTMF, ONU management proxy or vOMCI).

Hereinafter, further detailed description will be made to the present disclosure with reference to the accompanying drawings.

FIG. 1 shows a flowchart of a method for triggering vOMCI function from OLT to send OMCI messages according to an embodiment of the present disclosure. The method in this embodiment is mainly executed by an OLT. The method according to the present embodiment includes step S11, step S12, and step S13. In step S11, the OLT generates a content message that needs to be sent to ONU based on OMCI protocol; in step S12, the OLT obtains an ONU list corresponding to the content message, and sending the content message and the ONU list to vOLTMF or vOMCI function deployed in a cloud serve; in step S13, the OLT receives an OMCI message sent by the vOMCI function, and sending the OMCI message to corresponding ONU, wherein the OMCI message is generated by the vOMCI function according to the content message.

In step S11, the OLT generates a content message that needs to be sent to ONU based on OMCI protocol. In the present disclosure, the content message may be any content that is generated in the OLT and needs to be sent to ONU based on OMCI Message, for example, a Time Status Message that needs to be converted into an OMCI Message and send to ONU. As an example, since the fixed network must have a clock function, the OLT needs to update the time status to ONU through OMCI message, and then since the vOMCI function moves the OMCI protocol stack out of the OLT device and deploys it in the cloud, the OLT needs to provide the updated time status message to the vOMCI function to trigger the vOMCI function to generate a corresponding time status OMCI message and send it to ONU. As another example, when an ONU is detected, the OLT needs to generate a time status message and provide the time status message to the vOMCI function to trigger the vOMCI function to generate a corresponding time status OMCI message and send it to the detected ONU.

In some embodiments, the step S11 includes: receiving a management command for ONU sent by a management device; generating a content message that needs to be sent to ONU based on OMCI protocol according to the management command. In some embodiments, the management device includes any device for managing OLT/ONU, such as the vOLTMF, ONU management proxy or vOMCI. As an example, OLT receives a management command for the target ONU(s) sent by the vOLTMF, and generates a time status message to be sent to the target ONU(s) according to the management command.

In step S12, the OLT obtains an ONU list corresponding to the content message, and sends the content message and the ONU list to vOLTMF or vOMCI function deployed in a cloud server. In some embodiments, the ONU list includes ONU identification information of one or more ONUs, and the ONU identification information includes, but not limited to, ONU ID or ONU name. In some embodiments, the ONUs in the ONU list are configured and online ONUs. In some embodiments, the OLT determines at least one ONU that needs the content message from the configured and online ONUs, and generates an ONU list corresponding to the at least one ONU. In some embodiments, the content message and the ONU list are merged and sent to the vOLTMF or vOMCI function.

In some embodiments, the vOLTMF or the vOMCI function may be deployed in the same cloud server, or may be deployed in different cloud servers, which is not limited in this disclosure. In some embodiments, the content message and the ONU list are sent to the vOLTMF through the interface between the OLT and the vOLTMF, the vOLTMF checks the ONU list, and distributes the content message to each ONU in the ONU list, and then sends the content messages corresponding to each ONU to the vOMCI function separately or together, so that the vOMCI function generates the OMCI message corresponding to each ONU according to the content message distributed to each ONU. In some embodiments, the content message and the ONU list are sent to the vOMCI function through the interface between the OLT and the vOMCI function, the vOMCI function checks the ONU list, distributes the content message to each ONU in the ONU list, and generates OMCI message corresponding to each ONU according to the content message distributed to each ONU; it should be noted that, in the system for implementing these embodiments, vOLTMF may or may not be deployed.

In step S13, the OLT receives an OMCI message sent by the vOMCI function, and sends the OMCI message to corresponding ONU, wherein the OMCI message is generated by the vOMCI function according to the content message. In some embodiments, the vOMCI function generates an OMCI message to be sent to a specific ONU according to the content message distributed to the specific ONU, and sends the OMCI message to the OLT through a Normal OMCI Interface with the OLT, and the OLT sends the OMCI message to the specific ONU after receiving the OMCI message.

In some embodiments, the step S12 includes: obtaining an ONU list corresponding to the content message through an ONU management function module in the OLT, and sending the content message and the ONU list to vOLTMF deployed in a cloud server through a NetConf server or a Data Management System (DMS) in the OLT, so that the vOLTMF distributes the content message to each ONU, and sends the content message corresponding to each ONU to vOMCI function deployed in a cloud server. Wherein, the ONU management function module in the OLT is designed to process the necessary ONU information in the OLT, and is an interface between the vOLTMF and the ONU module. As an example, a clock module in the OLT sends an updated time status message to the ONU management function module, the ONU management function module obtains an ONU list that needs the time status message, and sends the time status message and the ONU list to a NetConf server or a DMS in the OLT based on the corresponding protocol, the NetConf server or the DMS sends the time status message and the ONU list to the vOLTMF, so that the vOLTMF distributes the content message to each ONU in the ONU list after checking the ONU list, and sends the content message distributed to each ONU to the vOMCI function, thereby enabling the vOMCI function to generate corresponding OMCI message based on the content message allocated to each ONU, and send it to the corresponding ONU. Thus, through the interface between the OLT and the vOLTMF and the interface between the vOLTMF and the vOMCI function, a content message generated by the OLT can be forwarded from the OLT to the vOLTMF and the vOMCI function, and finally delivered to ONU using a new message and process.

In some embodiments, the step S12 includes: obtaining an ONU list corresponding to the content message through an ONU management function module in the OLT, and sending the content message and the ONU list to vOMCI function deployed in a cloud server through a vOMCI adapter in the OLT, so that the vOMCI function distributes the content message to each ONU, generates corresponding OMCI message according to the content message corresponding to each ONU, and sends the OMCI message to the corresponding ONU. Wherein, the vOMCI adapter in the OLT is used to connect with the vOMCI function, and it has the receiving and adapting functions of OMCI messages. As an example, the clock module in the OLT sends an updated time status message to the ONU management function module, the ONU management function module obtains an ONU list that needs the time status message, and sends the time status message and the ONU list to the vOMCI adapter in the OLT, and the vOMCI adapter sends the time status message and the ONU list to the vOMCI function, so that the vOMCI function distributes the content message to each ONU in the ONU list after checking the ONU list, and further generates an OMCI message for each ONU and sends it to the corresponding ONU.

In some embodiments, the content message is a time status message, and the time status message is generated by a clock module in the OLT. It should be noted that, for other OMCI messages besides the time status OMCI message, the content message thereof may be generated by other related modules in the OLT.

In some embodiments, the content message is a time status message, the step S11 includes: obtaining a time status message updated by a clock module in the OLT. As an example, the clock module updates the time status message and transmits the updated time status message to the ONU management function module.

In some embodiments, the content message is a time status message, the step S11 includes: sending an ONU discovery message to vOLTMF if receiving the ONU discovery message, and obtaining a time status message from a clock module in the OLT, wherein vOLTMF is used for configuring the discovered ONU according to the ONU discovery message, and the ONU list comprises ONU identification information corresponding to the ONU discovery message. In some embodiments, when the ONU management function module in the OLT receives an ONU discovery message (used for indicating that an ONU is detected), it needs to update the detected ONU to the NETCONF server in order to send the ONU discovery message to the vOLTMF on the cloud, which will configure the discovered ONU; in some embodiments, a vOMCI hardware path (vOMCI HW Path) in the OLT detects an ONU, and sends an ONU discovery message to the ONU Management function module, wherein the vOMCI hardware Path is OMCC (Optical Network Unit Management and Control Channel) on the OLT. In some embodiments, the transmission path of the ONU discovery message is the same as the transmission path of the time status message, that is, both are first transmitted to the vOLTMF and then to the vOMCI function, in this case, the ONU discovery message will arrive at the vOMCI function earlier than the time status message. In some embodiments, the transmission path of the ONU discovery message is different from the transmission path of the time status message, that is, the ONU discovery message needs to be transmitted to the vOLTMF first, and then to the vOMCI function, and the time status message and ONU list are sent directly from the OLT to the vOMCI function, in this case, the ONU discovery message and the time status message arrive at the vOMCI function in no predetermined order, for example, the ONU discovery message may arrive at the vOMCI function earlier or later than the time status message. The present disclosure considers that if the ONU discovery message and the time status message are transmitted through different transmission paths, there may be a race condition, that is, when the time status message arrives at the vOMCI function, the configuration of the newly detected ONU by vOLTMF may not have arrived at the vOMCI function, so the vOMCI function cannot recognize the ONU identification information corresponding to the time status message it received. In view of this situation, the present disclosure proposes a retransmission backpressure scheme.

In some embodiments, the time status message and the ONU identification information are sent directly from the OLT to the vOMCI function, the method further comprises: receiving a backpressure message sent by the vOMCI function for indicating that the ONU identification information cannot be recognized, wherein the backpressure message comprises the ONU identification information; checking whether the ONU identification information is legal, if so, re-obtaining a time status message from the clock module in the OLT again, and sending the re-obtained time status message and the ONU identification information directly from the OLT to the vOMCI function. In some embodiments, the vOMCI function receives a time status message and ONU identification information from the OLT, if the ONU identification information cannot be recognized, the vOMCI function sends a backpressure message to a vOMCI adapter in the OLT to inform the vOMCI adapter that the ONU identification information corresponding to the time status message cannot be recognized, the vOMCI adapter sends the backpressure message to the ONU management function module, the ONU management function module checks whether the ONU identification information is legal or detectable, and if legal/detectable, obtains a time status message from the clock module again, and resends the time status message and the ONU identification information to the vOMCI adapter, so as to transmit the time status message and the ONU identification information to the vOMCI function through the vOMCI adapter.

Figure 2:
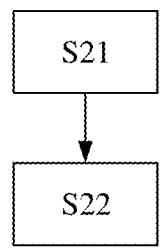
FIG. 2 shows a flowchart of a method for triggering vOMCI function from OLT to send OMCI messages according to another embodiment of the present disclosure.

FIG. 2 shows a flowchart of a method for triggering vOMCI function from OLT to send OMCI messages according to another embodiment of the present disclosure. The method of the embodiment is mainly implemented by the vOMCI function deployed in a server. The method according to the present embodiment includes step S21 and step S22. In step S21, the vOMCI function obtains the content message corresponding to each ONU, wherein the content message is generated by an OLT and needs to be sent to each ONU based on OMCI protocol, the vOMCI function or vOLTMF deployed in a cloud server executes the operation of distributing the content message to each ONU; in step S22, for each ONU, the vOMCI function generates an OMCI message to be sent to the ONU according to the content message corresponding to the ONU, and sending the OMCI message to the OLT.

In step S21, the vOMCI function obtains the content message corresponding to each ONU, wherein the content message is generated by an OLT and needs to be sent to each ONU based on OMCI protocol, the vOMCI function or vOLTMF deployed in a cloud server executes the operation of distributing the content message to each ONU. Wherein, the related descriptions about the content message in the foregoing embodiments are all included here by way of reference, and will not be repeated here. In some embodiments, the operation of distributing the content message to each ONU may be implemented by the vOMCI function or a specific module therein (the specific module maintains ONU related information, which can be used to perform the cheaking operation of the ONU list and the distributing operation of the content message), or may be implemented by the vOLTMF deployed in a cloud server or a specific module therein.

In some embodiments, the step S21 includes: receiving content message corresponding to each ONU sent by the vOLTMF deployed in the cloud server, wherein the vOLTMF checks an ONU list and distributes the content message to each ONU after receiving the content message and the ONU list corresponding to the content message sent by the OLT. In some embodiments, the vOLTMF may send the content message distributed to each ONU to the vOMCI function through one or more messages. For example, after receiving a time status message and an ONU list corresponding to the time status message sent by the OLT, the vOLTMF checks the ONU list, copies the time status message into multiple after the check is completed, and distributes one time status message to each ONU in the ONU list; and then, the vOLTMF sends the time status message distributed for each ONU to the vOMCI function, and the vOMCI function receives the time status message distributed for each ONU sent by the vOLTMF.

In some embodiments, the step S21 includes: receiving a content message and an ONU list corresponding to the content message sent by an OLT; checking the ONU list and distributing the content message to each ONU. For example, the vOMCI function receives a time status message and an ONU list corresponding to the time status message sent by the OLT, then checks the ONU list, copies the time status message into multiple after the check is completed, and distributes one time status message to each ONU in the ONU list.

In step S22, for each ONU, the vOMCI function generates an OMCI message to be sent to the ONU according to the content message corresponding to the ONU, and sends the OMCI message to the OLT. For example, the vOMCI function generates a time status OMCI message to be sent to a specific ONU according to the time status message distributed to the specific ONU, and sends the time status OMCI message to the OLT. In some embodiments, the vOMCI function sends the generated OMCI message to the OLT through the normal OMCI interface with the OLT, so that the OLT sends the OMCI message to the corresponding ONU.

In some embodiments, the content message is a time status message generated by the OLT when detecting a new ONU, if the ONU discovery message and the time status message are transmitted through different transmission paths, there may be a situation that the vOMCI function cannot recognize the received ONU identification information, and the method further includes: generating a backpressure message if the ONU identification information in the ONU list cannot be recognized, wherein the backpressure message comprises the ONU identification information; sending the backpressure message to the OLT. The related contents have been detailed in the foregoing embodiments, and will not be repeated here.

Figure 3:
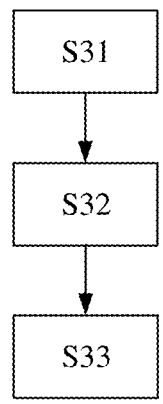
FIG. 3 shows a flowchart of a method for triggering vOMCI function from OLT to send OMCI messages according to another embodiment of the present disclosure.

FIG. 3 shows a flowchart of a method for triggering vOMCI function from OLT to send OMCI messages according to another embodiment of the present disclosure, the method of this embodiment is mainly implemented by vOLTMF deployed in a cloud server, and the method includes step S31, step S32, and step S33. In step S31, the vOLTMF receives a content message that needs to be sent to ONU based on OMCI protocol and an ONU list corresponding to the content message sent by an OLT; in step S32, the vOLTMF checks the ONU list, and distributes the content message to each ONU; in step S33, the vOLTMF sends the content message corresponding to each ONU to vOMCI function deployed in a cloud server.

In step S31, the vOLTMF receives a content message that needs to be sent to ONU based on OMCI protocol and an ONU list corresponding to the content message sent by an OLT. In some embodiments, the vOLTMF receives an content message and an ONU list corresponding to the content message notified by the NetConf server or DMS in the OLT. In some embodiments, the OLT sends the content message and the ONU list corresponding to the content message to the vOLTMF in a new message format, and this disclosure does not specifically limit the new message format.

In step S32, the vOLTMF checks the ONU list and distributes the content message to each ONU. For example, the content message is a time status message, the vOLTMF checks the received ONU list, and distributes the time status message to each ONU in the ONU list after the check is passed.

In step S33, the vOLTMF sends the content message corresponding to each ONU (that is, the content message distributed for each ONU) to vOMCI function deployed in a cloud server. In some embodiments, the vOLTMF may send the content message distributed for each ONU to the vOMCI function through one or more messages. In some embodiments, the vOLTMF sends the content message distributed for each ONU to the vOMCI function in a new message format, and this disclosure does not specifically limit the new message format.

Figure 4:
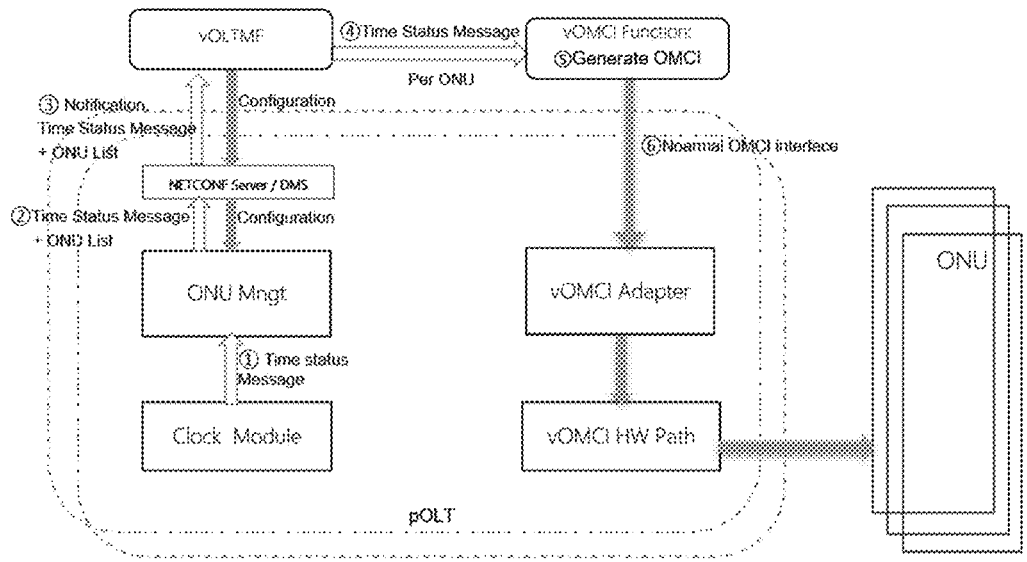
FIG. 4 shows a system architecture diagram for triggering vOMCI function from OLT to send OMCI messages according to an example of the present disclosure.

FIG. 4 shows a system architecture diagram for triggering vOMCI function from OLT to send OMCI messages according to an example of the present disclosure. The system includes pOLT (physical OLT), ONU, and vOLTMF and vOMCI Function deployed in cloud side, the vOLTMF and vOMCI Function may be deployed on the same cloud server or on different cloud servers, which is not limited in this disclosure. The pOLT includes vOMCI Adapter, vOMCI HW Path (vOMCI hardware path and ONU online detection), NETCONF Server/DMS (Data Management System), ONU Mngt (ONU management function module) and Clock Module, it should be noted that this example is described with Time Status Message as an example, so the Clock Module is shown in the pOLT, those skilled in the art should understand that the solution of the present disclosure is not limited to the Time Status Message, for other content message, it can be obtained in the pOLT through other hardware or software. In this example, for a scenario where the pOLT needs to update the time status message to ONU, the process of triggering the vOMCI Function from the pOLT to send OMCI messages is as follows: 1) the Clock Module updates the time status message, and sends the updated time status message to the ONU Mngt; 2) the ONU Mngt obtains an ONU List that needs the time status message from the configuration, and sends the time status message and the ONU List to the NetConf Server/DMS based on the corresponding protocol; 3) the NetConf Server/DMS sends the time status message and the ONU list to the vOLTMF through Notification; 4) the vOLTMF checks the received ONU list, distributes the time status message to each ONU in the ONU list, and sends the time status message corresponding to each ONU to the vOMCI Function; 5) the vOMCI Function generates corresponding time status OMCI message(s) according to the time status message corresponding to each ONU; 6) the vOMCI Function sends the generated OMCI message(s) to the pOLT through the Normal OMCI interface with the pOLT, the vOMCI Adapter in the pOLT receives the OMCI message(s) from the vOMCI Function, and sends the received OMCI message(s) to the corresponding ONU(s) through the vOMCI HW Path.

Figure 5:
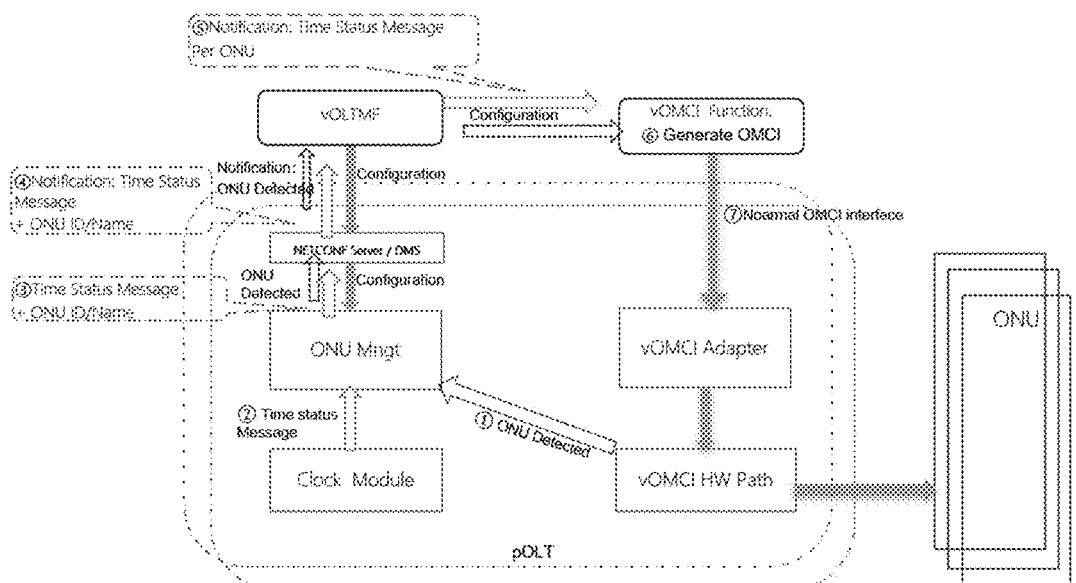
FIG. 5 shows a system architecture diagram for triggering vOMCI function from OLT to send OMCI messages according to another example of the present disclosure.

FIG. 5 shows a system architecture diagram for triggering vOMCI function from OLT to send OMCI messages according to another example of the present disclosure. The system architecture shown in FIG. 5 is the same as that shown in FIG. 4, and will not be repeated here. In this example, taking a scenario where pOLT needs to send a time status message to an ONU when it detects the ONU as an example, the process of triggering vOMCI Function from pOLT to send OMCI message is as follows: 1) the ONU Mngt module receives an ONU discovery message (indicating that an ONU is detected, see "ONU Detected" shown in FIG. 5) sent by the vOMCI HW Path, and sends the ONU discovery message to the NETCONF server or DMS, so as to notify the vOLTMF in the cloud of the ONU discovery message, the vOLTMF will configure the newly detected ONU, see the dotted arrow shown in FIG. 5 for the process; 2) the ONU Mngt obtains a time status message from the Clock Module; 3) the ONU Mngt sends the time status message and the ONU ID/Name of the newly detected ONU to the NETCONF Sever or DMS (following the ONU discovery message, but later than the ONU discovery message); 4) the NetConf Server or DMS sends the time status message and ONU ID/Name to the vOLTMF through notification (following the ONU discovery message, but later than the ONU discovery message); 5) the vOLTMF sends the time status message corresponding to the newly detected ONU to the vOMCI Function (following the configuration of the newly detected ONU by the vOLTMF); 6) the vOMCI Function generates a time status OMCI message that needs to be sent to the ONU according to the time status message corresponding to the newly detected ONU; 7) the vOMCI Function sends the generated OMCI message to the pOLT through the normal OMCI interface with the pOLT, the vOMCI Adapter in the pOLT receives the OMCI message from the vOMCI Function, and sends the OMCI message to the newly detected ONU through the vOMCI HW Path. In this example, since the ONU discovery message and the time status message use the same transmission path to the vOMCI Function, there is no race condition.

Figure 6:
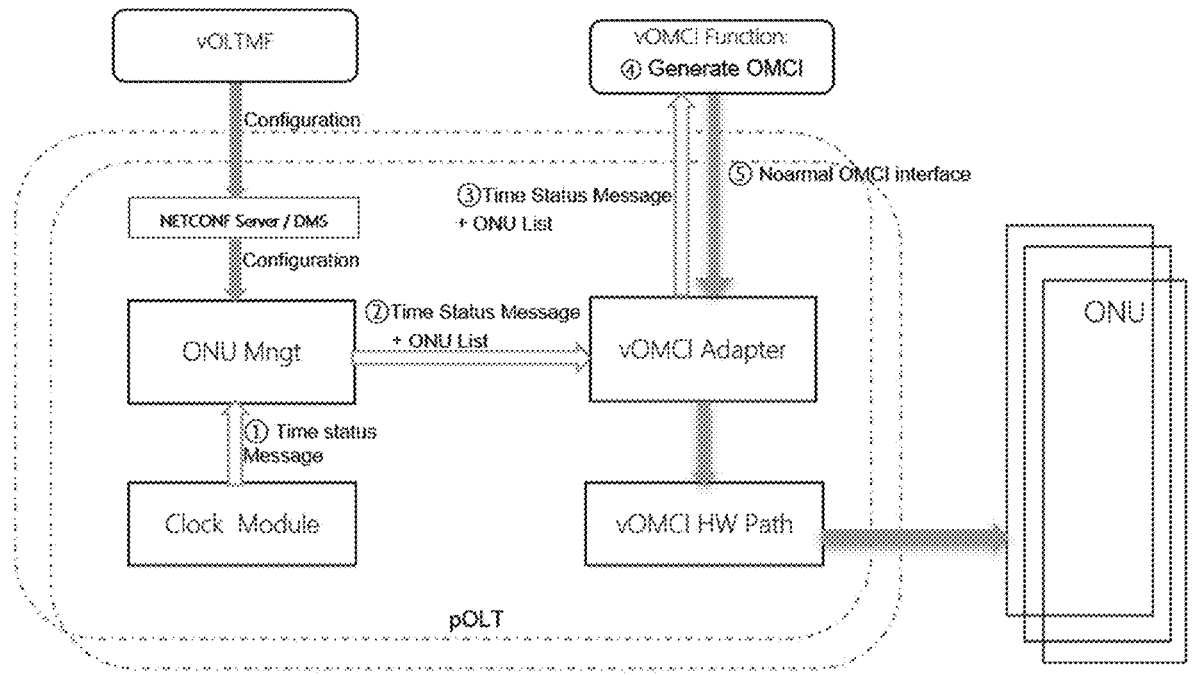
FIG. 6 shows a system architecture diagram for triggering vOMCI function from OLT to send OMCI messages according to another example of the present disclosure.

FIG. 6 shows a system architecture diagram for triggering vOMCI function from OLT to send OMCI messages according to another example of the present disclosure. The system architecture shown in FIG. 6 is the same as that shown in FIG. 4, and will not be repeated here. In this example, for a scenario where the pOLT needs to update the time status message to ONU, the process of triggering the vOMCI Function from pOLT to send OMCI messages is as follows: 1) the Clock Module updates the time status message, and sends the updated time status message to the ONU Mngt; 2) the ONU Mngt collects an ONU List that needs the time status message from the configuration, and combines the time status message and the ONU List and then sends them to the vOMCI Adapter; 3) the vOMCI Adapter sends the time status message and the ONU list to the vOMCI Function through a new message; 4) the vOMCI Function checks the received ONU list, distributes the time status message to each ONU in the ONU list, and generates the time status OMCI message(s) to be sent to each ONU; 5) the vOMCI Function sends the generated OMCI message(s) to the pOLT through the normal OMCI interface with the pOLT, the vOMCI Adapter in the pOLT receives the OMCI message(s) from the vOMCI Function, and sends the received OMCI message(s) to the corresponding ONU(s) through the vOMCI HW Path. It should be noted that, in this example, since the time status message does not need to be transmitted to the vOLTMF, the connection between the vOLTMF and the ONU Mngt shown in FIG. 6 may be removed. It should be noted that, the above process may be initiated by the pOLT side actively, or may be initiated by the pOLT based on a management command after receiving the management command sent by a management device; for example, pOLT receives a management command for querying time status message from the vOLTMF, and then performs the above operation 1) according to the management command to start the above process.

Figure 7:
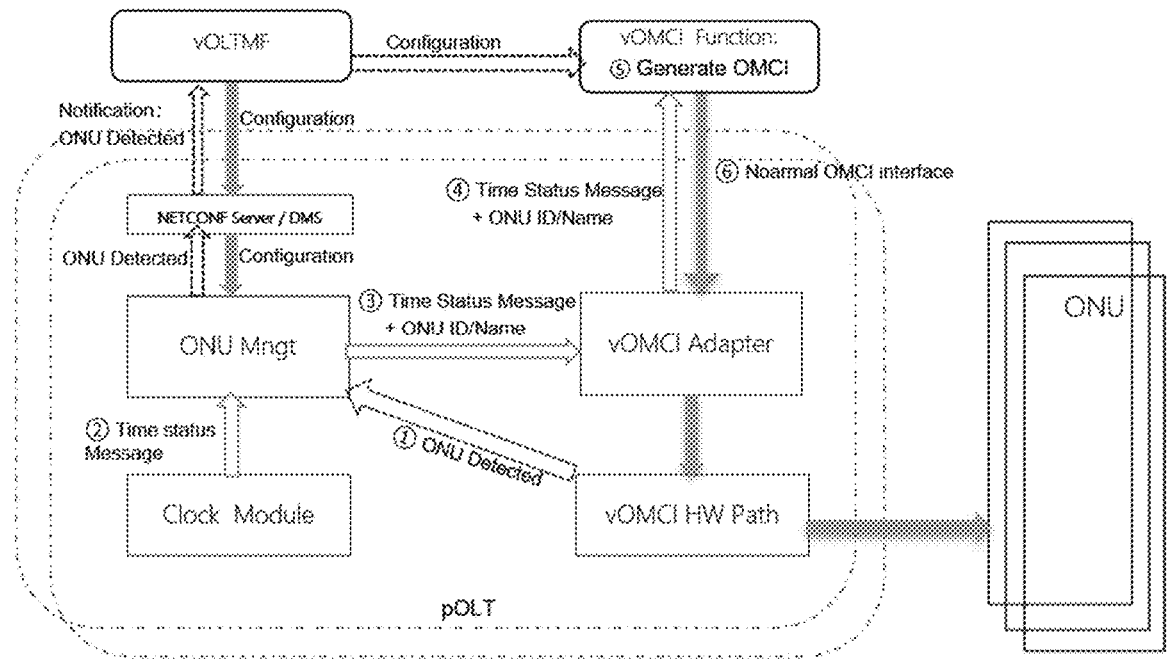
FIG. 7 shows a system architecture diagram for triggering vOMCI function from OLT to send OMCI messages according to another example of the present disclosure.

FIG. 7 shows a system architecture diagram for triggering vOMCI function from OLT to send OMCI messages according to another example of the present disclosure. The system architecture shown in FIG. 7 is the same as that shown in FIG. 4, and will not be repeated here. In this example, taking a scenario where the pOLT needs to send a time status message to an ONU when it detects the ONU as an example, the process of triggering the vOMCI Function from pOLT to send OMCI message is as follows: 1) the ONU Mngt module receives an ONU discovery message (indicating that an ONU is detected) sent by the vOMCI HW Path, and sends the ONU discovery message to the NETCONF server or DMS, so as to notify the vOLTMF in the cloud of the ONU discovery message, the vOLTMF will configure the newly detected ONU, see the dotted arrow shown in FIG. 7 for the process; 2) the ONU Mngt obtains a time status message from the Clock Module; 3) the ONU Mngt sends the time status message and the ONU ID/Name of the newly detected ONU to the vOMCI Adapter together; 4) the vOMCI Adapter sends the time status message and the ONU ID/Name to the vOMCI Function through a new message; 5) the vOMCI Function checks the received ONU ID/Name, and generates a time status OMCI message that needs to be sent to the newly detected ONU according to the time status message after the checking is passed; 6) the vOMCI Function sends the generated OMCI message to the pOLT through the normal OMCI interface with the pOLT, the vOMCI Adapter in the pOLT receives the OMCI message from the vOMCI Function, and sends the OMCI message to the newly detected ONU through the vOMCI HW Path.

Figure 8:
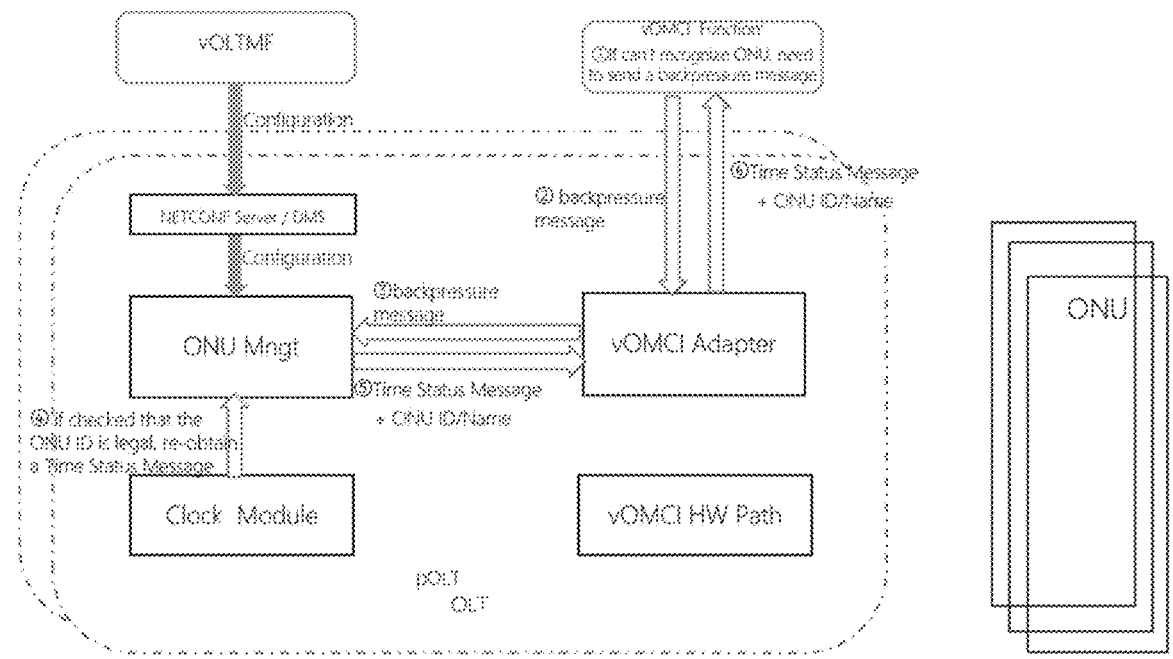
FIG. 8 shows a system architecture diagram for triggering vOMCI function from OLT to send OMCI messages according to another example of the present disclosure.

In the flow shown in FIG. 7, since the ONU discovery message and the time status message arrive at the vOMCI Function through different paths, there may be a race condition, that is, when the time status message arrives at the vOMCI Function, the configuration of the newly detected ONU may not arrive at the vOMCI Function yet, which makes the vOMCI Function unable to recognize the ONU identification information received together with the time status message. FIG. 8 illustrates the flow of the proposed retransmission backpressure scheme for this problem.

The system architecture shown in FIG. 8 is the same as the system architecture shown in FIG. 4, and will not be repeated here. The flow of the retransmission backpressure scheme shown in this example is as follows: 1) the vOMCI Function receives a time status message and an ONU ID/Name from the pOLT, but it cannot recognize the ONU ID/Name; 2) the vOMCI Function sends a backpressure message to the vOMCI Adapter through the interface with the pOLT to notify the vOMCI Adapter that the ONU ID/Name received together with the time status message cannot be recognized; 3) the vOMCI Adapter sends the backpressure message to the ONU Mngt; 4) the ONU Mngt checks whether the ONU ID/Name is legal or can be detected, and if the ONU ID/Name is legal/detectable, and if it is legal/detectable, the ONU Mngt obtains a time status message from the clock module; 5) the ONU Mngt resends the time status message and the ONU ID/Name to the vOMCI Adapter; 6) the vOMCI adapter resends the time status message and the ONU ID/Name to the vOMCI Function.

It should be noted that, in some embodiments, a vOMCI Proxy module is further deployed in the cloud server, and the vOMCI Proxy module may be used to perform the operation of checking the ONU list and distributing the content message to each ONU, or may be used to perform the operation of receiving the content message distributed to each ONU sent by the vOLTMF, and transparently transmitting the content message to the vOMCI Function, in practical applications, the functions of the vOMCI Proxy module may be designed based on actual needs. Taking FIG. 4 as an example, if a vOMCI Proxy module is further deployed in the system architecture, after step 3), checking the received ONU list, distributing the time status message to each ONU in the ONU list, and sending the time status message corresponding to each ONU to the vOMCI Proxy, so that the vOMCI Proxy transparently transmits the time status message corresponding to each ONU to the vOMCI Function, the operations performed by the vOMCI Function after receiving the time status message corresponding to each ONU are the same as that in FIG. 4, and will not be repeated here. Taking FIG. 6 as an example, if a vOMCI Proxy module is further deployed in the system architecture, after step 2), the vOMCI Adapter sends the time status message and the ONU list to the vOMCI Proxy through a new message, the vOMCI Proxy checks the received ONU list, distributes the time status message to each ONU in the ONU list, and sends the time status message corresponding to each ONU to the vOMCI Function, the operations performed by the vOMCI Function after obtaining the time status message corresponding to each ONU are the same as that in FIG. 6, and will not be repeated here.

Figure 9:
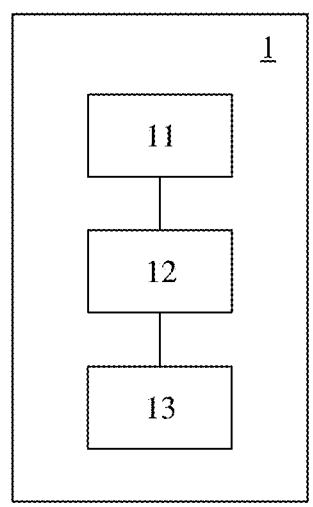
FIG. 9 shows a structural diagram of a first apparatus for triggering vOMCI function from OLT to send OMCI messages according to an embodiment of the present disclosure.

FIG. 9 shows a structural diagram of a first apparatus for triggering vOMCI function from OLT to send OMCI messages according to an embodiment of the present disclosure. The first apparatus 1 includes a means 11, a means 12 and a means 13.

The means 11 is used for generating a content message that needs to be sent to ONU based on OMCI protocol. In the present disclosure, the content message may be any content that is generated in the OLT and needs to be sent to ONU based on OMCI Message, for example, a Time Status Message that needs to be converted into an OMCI Message and send to ONU. As an example, since the fixed network must have a clock function, the OLT needs to update the time status to ONU through OMCI message, and then since the vOMCI function moves the OMCI protocol stack out of the OLT device and deploys it in the cloud, the OLT needs to provide the updated time status message to the vOMCI function to trigger the vOMCI function to generate a corresponding time status OMCI message and send it to ONU. As another example, when an ONU is detected, the means 11 in the OLT needs to generate a time status message and provide the time status message to the vOMCI function to trigger the vOMCI function to generate a corresponding time status OMCI message and send it to the detected ONU.

In some embodiments, the means 11 is used for: receiving a management command for ONU sent by a management device; generating a content message that needs to be sent to ONU based on OMCI protocol according to the management command. In some embodiments, the management device includes any device for managing OLT/ONU, such as the vOLTMF, ONU management proxy or vOMCI. As an example, the means 11 receives a management command for the target ONU(s) sent by the vOLTMF, and generates a time status message to be sent to the target ONU(s) according to the management command.

The means 12 is used for obtaining an ONU list corresponding to the content message, and sending the content message and the ONU list to vOLTMF or vOMCI function deployed in a cloud server. In some embodiments, the ONU list includes ONU identification information of one or more ONUs, and the ONU identification information includes, but not limited to, ONU ID or ONU name. In some embodiments, the ONUs in the ONU list are configured and online ONUs. In some embodiments, determining at least one ONU that needs the content message from the configured and online ONUs, and generating an ONU list corresponding to the at least one ONU. In some embodiments, the content message and the ONU list are merged and sent to the vOLTMF or vOMCI function.

In some embodiments, the vOLTMF or the vOMCI function may be deployed in the same cloud server, or may be deployed in different cloud servers, which is not limited in this disclosure. In some embodiments, the content message and the ONU list are sent to the vOLTMF through the interface between the OLT and the vOLTMF, the vOLTMF checks the ONU list, and distributes the content message to each ONU in the ONU list, and then sends the content messages corresponding to each ONU to the vOMCI function separately or together, so that the vOMCI function generates the OMCI message corresponding to each ONU according to the content message distributed to each ONU. In some embodiments, the content message and the ONU list are sent to the vOMCI function through the interface between the OLT and the vOMCI function, the vOMCI function checks the ONU list, distributes the content message to each ONU in the ONU list, and generates OMCI message corresponding to each ONU according to the content message distributed to each ONU; it should be noted that, in the system for implementing these embodiments, vOLTMF may or may not be deployed.

The means 13 is used for receiving an OMCI message sent by the vOMCI function, and sending the OMCI message to corresponding ONU, wherein the OMCI message is generated by the vOMCI function according to the content message. In some embodiments, the vOMCI function generates an OMCI message to be sent to a specific ONU according to the content message distributed to the specific ONU, and sends the OMCI message to the OLT through a Normal OMCI Interface with the OLT, and the means 13 in the OLT sends the OMCI message to the specific ONU after receiving the OMCI message.

In some embodiments, the means 12 is used for: obtaining an ONU list corresponding to the content message through an ONU management function module in the OLT, and sending the content message and the ONU list to vOLTMF deployed in a cloud server through a NetConf server or a Data Management System (DMS) in the OLT, so that the vOLTMF distributes the content message to each ONU, and sends the content message corresponding to each ONU to vOMCI function deployed in a cloud server. Wherein, the ONU management function module in the OLT is designed to process the necessary ONU information in the OLT, and is an interface between the vOLTMF and the ONU module. As an example, a clock module in the OLT sends an updated time status message to the ONU management function module, the ONU management function module obtains an ONU list that needs the time status message, and sends the time status message and the ONU list to a NetConf server or a DMS in the OLT based on the corresponding protocol, the NetConf server or the DMS sends the time status message and the ONU list to the vOLTMF, so that the vOLTMF distributes the content message to each ONU in the ONU list after checking the ONU list, and sends the content message distributed to each ONU to the vOMCI function, thereby enabling the vOMCI function to generate corresponding OMCI message based on the content message allocated to each ONU, and send it to the corresponding ONU, the means 12 may include one or more modules involved above. Thus, through the interface between the OLT and the vOLTMF and the interface between the vOLTMF and the vOMCI function, a content message generated by the OLT can be forwarded from the OLT to the vOLTMF and the vOMCI function, and finally delivered to ONU using a new message and process.

In some embodiments, the means 12 is used for: obtaining an ONU list corresponding to the content message through an ONU management function module in the OLT, and sending the content message and the ONU list to vOMCI function deployed in a cloud server through a vOMCI adapter in the OLT, so that the vOMCI function distributes the content message to each ONU, generates corresponding OMCI message according to the content message corresponding to each ONU, and sends the OMCI message to the corresponding ONU. Wherein, the vOMCI adapter in the OLT is used to connect with the vOMCI function, and it has the receiving and adapting functions of OMCI messages. As an example, the clock module in the OLT sends an updated time status message to the ONU management function module, the ONU management function module obtains an ONU list that needs the time status message, and sends the time status message and the ONU list to the vOMCI adapter in the OLT, and the vOMCI adapter sends the time status message and the ONU list to the vOMCI function, so that the vOMCI function distributes the content message to each ONU in the ONU list after checking the ONU list, and further generates an OMCI message for each ONU and sends it to the corresponding ONU, the means 12 may include one or more modules involved above.

In some embodiments, the content message is a time status message, and the time status message is generated by a clock module in the OLT. It should be noted that, for other OMCI messages besides the time status OMCI message, the content message thereof may be generated by other related modules in the OLT.

In some embodiments, the content message is a time status message, the means 11 is used for: obtaining a time status message updated by a clock module in the OLT. As an example, the means 11 includes a ONU management function module, the clock module updates the time status message and transmits the updated time status message to the ONU management function module.

In some embodiments, the content message is a time status message, the means 11 is used for: sending an ONU discovery message to vOLTMF if receiving the ONU discovery message, and obtaining a time status message from a clock module in the OLT, wherein vOLTMF is used for configuring the discovered ONU according to the ONU discovery message, and the ONU list comprises ONU identification information corresponding to the ONU discovery message. In some embodiments, when the ONU management function module in the OLT receives an ONU discovery message (used for indicating that an ONU is detected), it needs to update the detected ONU to the NETCONF server in order to send the ONU discovery message to the vOLTMF on the cloud, which will configure the discovered ONU, the means 11 may include one or more modules involved above; in some embodiments, a vOMCI hardware path (vOMCI HW Path) in the OLT detects an ONU, and sends an ONU discovery message to the ONU Management function module, wherein the vOMCI hardware Path is OMCC (Optical Network Unit Management and Control Channel) on the OLT, the means 11 may include one or more modules involved above. In some embodiments, the transmission path of the ONU discovery message is the same as the transmission path of the time status message, that is, both are first transmitted to the vOLTMF and then to the vOMCI function, in this case, the ONU discovery message will arrive at the vOMCI function earlier than the time status message. In some embodiments, the transmission path of the ONU discovery message is different from the transmission path of the time status message, that is, the ONU discovery message needs to be transmitted to the vOLTMF first, and then to the vOMCI function, and the time status message and ONU list are sent directly from the OLT to the vOMCI function, in this case, the ONU discovery message and the time status message arrive at the vOMCI function in no predetermined order, for example, the ONU discovery message may arrive at the vOMCI function earlier or later than the time status message. The present disclosure considers that if the ONU discovery message and the time status message are transmitted through different transmission paths, there may be a race condition, that is, when the time status message arrives at the vOMCI function, the configuration of the newly detected ONU by vOLTMF may not have arrived at the vOMCI function, so the vOMCI function cannot recognize the ONU identification information corresponding to the time status message it received. In view of this situation, the present disclosure proposes a retransmission backpressure scheme.

In some embodiments, the time status message and the ONU identification information are sent directly from the OLT to the vOMCI function, the first apparatus 1 further used for: receiving a backpressure message sent by the vOMCI function for indicating that the ONU identification information cannot be recognized, wherein the backpressure message comprises the ONU identification information; checking whether the ONU identification information is legal, if so, re-obtaining a time status message from the clock module in the OLT again, and sending the re-obtained time status message and the ONU identification information directly from the OLT to the vOMCI function. In some embodiments, the vOMCI function receives a time status message and ONU identification information from the OLT, if the ONU identification information cannot be recognized, the vOMCI function sends a backpressure message to a vOMCI adapter in the OLT to inform the vOMCI adapter that the ONU identification information corresponding to the time status message cannot be recognized, the vOMCI adapter sends the backpressure message to the ONU management function module, the ONU management function module checks whether the ONU identification information is legal or detectable, and if legal/detectable, obtains a time status message from the clock module again, and resends the time status message and the ONU identification information to the vOMCI adapter, so as to transmit the time status message and the ONU identification information to the vOMCI function through the vOMCI adapter.

Figure 10:
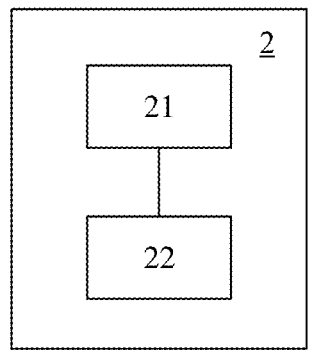
FIG. 10 shows a structural diagram of a second apparatus for triggering vOMCI function from OLT to send OMCI messages according to an embodiment of the present disclosure.

FIG. 10 shows a structural diagram of a second apparatus for triggering vOMCI function from OLT to send OMCI messages according to an embodiment of the present disclosure. The second apparatus 2 includes a means 21 and a means 22.

The means 21 is used for obtaining the content message corresponding to each ONU, wherein the content message is generated by an OLT and needs to be sent to each ONU based on OMCI protocol, the vOMCI function or vOLTMF deployed in a cloud server executes the operation of distributing the content message to each ONU. Wherein, the related descriptions about the content message in the foregoing embodiments are all included here by way of reference, and will not be repeated here. In some embodiments, the operation of distributing the content message to each ONU may be implemented by the vOMCI function or a specific module therein (the specific module maintains ONU related information, which can be used to perform the cheaking operation of the ONU list and the distributing operation of the content message), or may be implemented by the vOLTMF deployed in a cloud server or a specific module therein.

In some embodiments, the means 21 is used for: receiving content message corresponding to each ONU sent by the vOLTMF deployed in the cloud server, wherein the vOLTMF checks an ONU list and distributes the content message to each ONU after receiving the content message and the ONU list corresponding to the content message sent by the OLT. In some embodiments, the vOLTMF may send the content message distributed to each ONU to the vOMCI function through one or more messages. For example, after receiving a time status message and an ONU list corresponding to the time status message sent by the OLT, the vOLTMF checks the ONU list, copies the time status message into multiple after the check is completed, and distributes one time status message to each ONU in the ONU list; and then, the vOLTMF sends the time status message distributed for each ONU to the vOMCI function, and the means 21 in the vOMCI function receives the time status message distributed for each ONU sent by the vOLTMF.

In some embodiments, the means 21 is used for: receiving a content message and an ONU list corresponding to the content message sent by an OLT; checking the ONU list and distributing the content message to each ONU. For example, the means 21 in the vOMCI function receives a time status message and an ONU list corresponding to the time status message sent by the OLT, then checks the ONU list, copies the time status message into multiple after the check is completed, and distributes one time status message to each ONU in the ONU list.

The means 21 is used for generating, for each ONU, an OMCI message to be sent to the ONU according to the content message corresponding to the ONU, and sending the OMCI message to the OLT. For example, the vOMCI function generates a time status OMCI message to be sent to a specific ONU according to the time status message distributed to the specific ONU, and sends the time status OMCI message to the OLT. In some embodiments, the means 21 sends the generated OMCI message to the OLT through the normal OMCI interface between the vOMCI function and the OLT, so that the OLT sends the OMCI message to the corresponding ONU.

In some embodiments, the content message is a time status message generated by the OLT when detecting a new ONU, if the ONU discovery message and the time status message are transmitted through different transmission paths, there may be a situation that the vOMCI function cannot recognize the received ONU identification information, and the second apparatus 2 further used for: generating a backpressure message if the ONU identification information in the ONU list cannot be recognized, wherein the backpressure message comprises the ONU identification information; sending the backpressure message to the OLT. The related contents have been detailed in the foregoing embodiments, and will not be repeated here.

Figure 11:
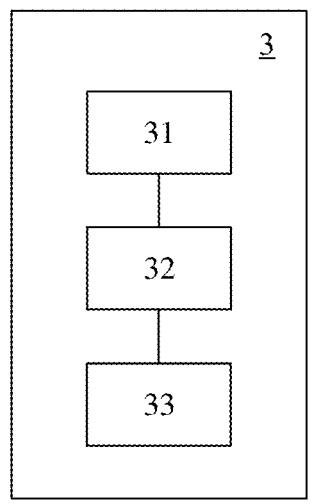
FIG. 11 shows a structural diagram of a third apparatus for triggering vOMCI function from OLT to send OMCI messages according to an embodiment of the present disclosure.

FIG. 11 shows a structural diagram of a third apparatus for triggering vOMCI function from OLT to send OMCI messages according to an embodiment of the present disclosure. The third apparatus 3 includes a means 31, a means 32 and a means 33.

The means 31 is used for receiving a content message that needs to be sent to ONU based on OMCI protocol and an ONU list corresponding to the content message sent by an OLT. In some embodiments, the means 31 in the vOLTMF receives an content message and an ONU list corresponding to the content message notified by the NetConf server or DMS in the OLT. In some embodiments, the OLT sends the content message and the ONU list corresponding to the content message to the vOLTMF in a new message format, and this disclosure does not specifically limit the new message format.

The means 32 is used for checking the ONU list and distributing the content message to each ONU. For example, the content message is a time status message, the means 32 in the vOLTMF checks the received ONU list, and distributes the time status message to each ONU in the ONU list after the check is passed.

The means 33 is used for sending the content message corresponding to each ONU (that is, the content message distributed for each ONU) to vOMCI function deployed in a cloud server. In some embodiments, the means 33 in the vOLTMF may send the content message distributed for each ONU to the vOMCI function through one or more messages. In some embodiments, the means 33 sends the content message distributed for each ONU to the vOMCI function in a new message format, and this disclosure does not specifically limit the new message format.

According to the solution of this disclosure, by using the interface between OLT and vOLTMF, and the interface between vOLTMF and vOMCI function, or using the interface between OLT and vOMCI function, a content message generated at the OLT side can be sent to the vOMCI function to trigger the vOMCI function to generate corresponding OMCI message according to the content message and send the OMCI message to corresponding ONU, therefore, for the content messages that are generated in the OLT and need to be sent to ONU based on OMCI protocol, a mechanism for triggering vOMCI function from OLT to send OMCI messages to ONU is provided.

It should be noted that, the system to which the technical solution of this disclosure is applicable may be a GPON system or a next-generation passive optical network (such as XGPON) or any other passive optical network system that uses OMCI for management and control.

It should be noted that, the names of the various modules or means involved in this disclosure are only examples, rather than limitations to this disclosure, multiple modules or means may also be implemented by one module or mean through software or hardware, and each module or mean may also be divided into multiple modules or means to be implemented by software or hardware.

Figure 12:
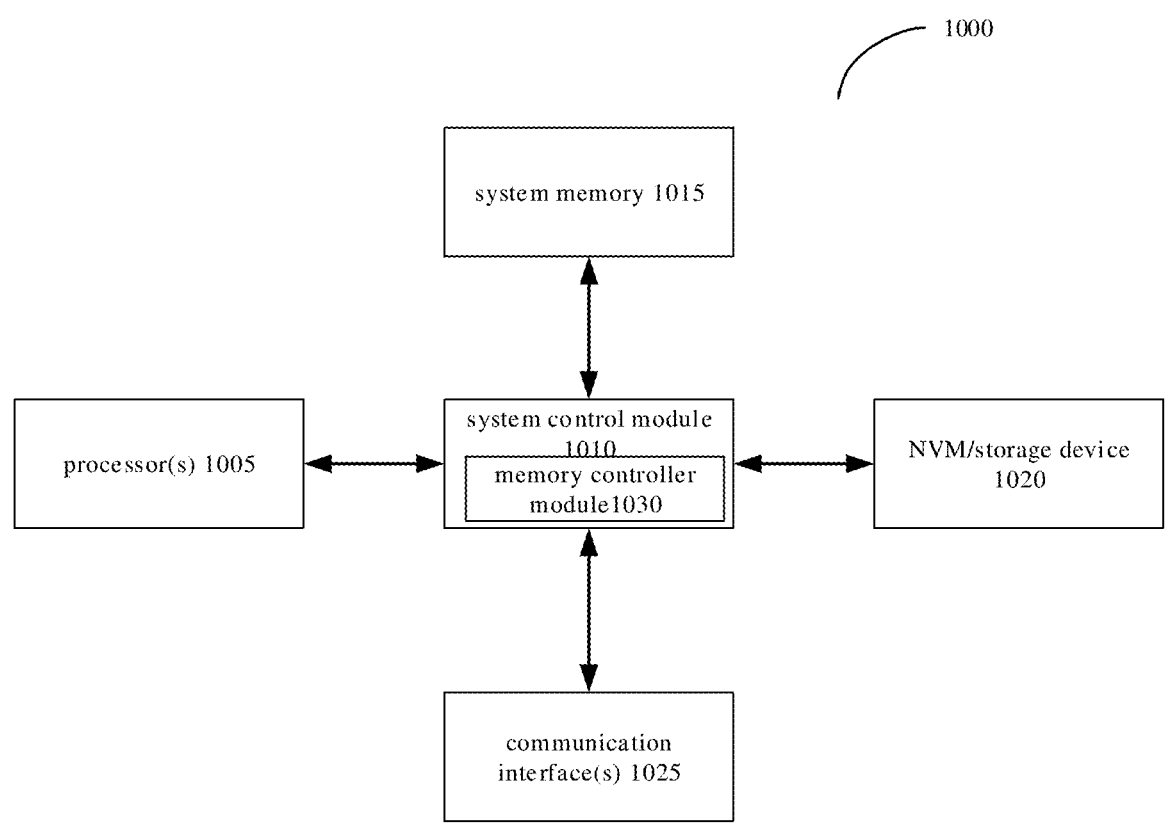
FIG. 12 shows an exemplary system that can be used to implement the various embodiments described in the present disclosure.

FIG. 12 shows an exemplary system that can be used to implement the various embodiments described in the present disclosure.

In some embodiments, the system 1000 can be used as any processing device in the embodiments of the present disclosure. In some embodiments, system 1000 may include one or more computer readable media (e.g., system memory or NVM/storage device 1020) having instructions and one or more processors (e.g., processor(s) 1005) coupled with the one or more computer readable media and configured to execute the instructions to implement modules to perform the actions described in the present disclosure.

For one embodiment, system control module 1010 may include any suitable interface controller to provide any suitable interface to at least one of processor(s) 1005 and/or to any suitable device or component in communication with system control module 1010.

The system control module 1010 may include a memory controller module 1030 to provide an interface to the system memory 1015. Memory controller module 1030 may be a hardware module, a software module, and/or a firmware module.

System memory 1015 may be used to load and store data and/or instructions, for example, for system 1000. For one embodiment, system memory 1015 may include any suitable volatile memory, such as suitable DRAM. In some embodiments, system memory 1015 may include a Double Data Rate type Fourth Synchronous Dynamic Random Access Memory (DDR4 SDRAM).

For one embodiment, system control module 1010 may include one or more input/output (I/O) controllers to provide an interface to NVM/storage device 1020 and communication interface(s) 1025.

For example, NVM/storage device 1020 may be used to store data and/or instructions. NVM/storage device 1020 may include any suitable non-volatile memory (e.g., flash memory) and/or may include any suitable non-volatile storage device(s) (e.g., one or more hard disk drives (HDD), one or more Compact Disc (CD) drives, and/or one or more Digital Versatile Disc (DVD) drives).

NVM/storage device 1020 may include storage resources that are physically part of the device on which system 1000 is installed, or it may be accessible by the device and not necessarily to be part of the device. For example, NVM/storage device 1020 may be accessed via the communication interface(s) 1025 through the network.

Communication interface(s) 1025 may provide an interface for system 1000 to communicate via one or more networks and/or with any other suitable devices. System 1000 may wirelessly communicate with one or more components of a wireless network according to any of one or more wireless network standards and/or protocols.

For one embodiment, at least one of the processor(s) 1005 may be packaged together with logic for one or more controller(s) (e.g., memory controller module 1030) of the system control module 1010. For one embodiment, at least one of the processor(s) 1005 may be packaged together with logic for one or more controller(s) of the system control module 1010 to form a System in Package (SiP). For one embodiment, at least one of the processor(s) 1005 may be integrated with logic for one or more controller(s) of the system control module 1010 on the same mold. For one embodiment, at least one of the processor(s) 1005 may be integrated with logic for one or more controller(s) of system control module 1010 on the same mold to form a system on chip (SoC).

In various embodiments, the system 1000 may be, but is not limited to being: a server, a workstation, a desktop computing device, or a mobile computing device (for example, a laptop computing device, a handheld computing device, a tablet, a netbook, etc.). In various embodiments, the system 1000 may have more or fewer components and/or different architectures. For example, in some embodiments, the system 1000 includes one or more cameras, a keyboard, a Liquid Crystal Display (LCD) screen (including a touch screen display), a non-volatile memory port, multiple antennas, a graphics chip, an Application Specific Integrated Circuit (ASIC), and speakers.

The present disclosure also provides a device, wherein the device comprising:
  a memory for storing one or more programs;
  one or more processors connected with the memory,
  the one or more programs, when executed by the one or more processors, cause the one or more processors to execute the method for triggering vOMCI function from OLT to send OMCI messages described in the present disclosure.

The present disclosure also provides a computer readable storage medium storing a computer program, which when executed by a processor, cause the processor to perform the method for triggering vOMCI function from OLT to send OMCI messages described in the present disclosure.

The present disclosure also provides a computer program product, which when executed by a device, cause the device to perform the method for triggering vOMCI function from OLT to send OMCI messages described in the present disclosure.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

The invention claimed is:

1. A method for triggering a virtual Optical Network Unit Management and Control Interface (vOMCI) function from an Optical Line Terminal (OLT) to send Optical Network Unit Management and Control Interface (OMCI) messages, which are applied to the OLT, the method comprising:

generating, by the OLT, a content message that needs to be sent to an Optical Network Unit (ONU) based on OMCI protocol;

obtaining an ONU list corresponding to the content message, and sending the content message and the ONU list to a vOLT Management Function (VOLTMF) or a vOMCI function deployed in a cloud server; and receiving an OMCI message sent by the vOMCI function, and sending the OMCI message to a corresponding ONU, wherein the OMCI message is generated by the vOMCI function according to the content message, and wherein the content message is a time status message, and the generating the content message that needs to be sent to the ONU based on the OMCI protocol comprises obtaining the time status message updated by a clock module in the OLT.

2. The method according to claim 1, wherein said obtaining the ONU list corresponding to the content message, and sending the content message and the ONU list to the VOLTMF or the vOMCI function deployed in the cloud server comprises:

obtaining the ONU list corresponding to the content message through an ONU management function module in the OLT, and sending the content message and the ONU list to the VOLTMF deployed in the cloud server through a NetConf server or a data management system in the OLT, such that the vOLTMF distributes the content message to each ONU, and sends the content message corresponding to each ONU to the vOMCI function deployed in the cloud server.

3. The method of claim 1, wherein said obtaining the ONU list corresponding to the content message, and sending the content message and the ONU list to the VOLTMF or the vOMCI function deployed in the cloud server comprises:

obtaining the ONU list corresponding to the content message through an ONU management function module in the OLT, and sending the content message and the ONU list to the vOMCI function deployed in the cloud server through a vOMCI adapter in the OLT.

4. The method according to claim 1, wherein said generating the content message that needs to be sent to the ONU based on the OMCI protocol comprises:

receiving a management command for the ONU sent by a management device; and generating the content message that needs to be sent to the ONU based on the OMCI protocol according to the management command.

5. The method according to claim 1, wherein said generating the content message that needs to be sent to the ONU based on the OMCI protocol comprises:

sending an ONU discovery message to the VOLTMF if receiving the ONU discovery message, and obtaining the time status message from the clock module in the OLT, wherein the VOLTMF is used for configuring a discovered ONU according to the ONU discovery message, and the ONU list comprises ONU identification information corresponding to the ONU discovery message.

6. The method according to claim 5, wherein the time status message and the ONU identification information are sent directly from the OLT to the vOMCI function, and the method further comprises:

receiving a backpressure message sent by the vOMCI function for indicating that the ONU identification information cannot be recognized, wherein the backpressure message comprises the ONU identification information; and checking whether the ONU identification information is legal, if so, re-obtaining the time status message from the clock module in the OLT again, and sending the re-obtained time status message and the ONU identification information directly from the OLT to the vOMCI function.

7. A method for triggering a virtual Optical Network Unit Management and Control Interface (vOMCI) function from an Optical Line Terminal (OLT) to send Optical Network Unit Management and Control Interface (OMCI) messages, which are applied to the vOMCI function deployed in a cloud server, the method comprising:

obtaining a content message corresponding to each Optical Network Unit (ONU), wherein the content message is generated by the OLT and needs to be sent to each ONU based on an OMCI protocol, the vOMCI function or a VOLT Management Function (VOLTMF) deployed in the cloud server executes an operation of distributing the content message to each ONU, the content message being a time status message updated by a clock module in the OLT; and generating, for each ONU, an OMCI message to be sent to the ONU according to the content message corresponding to the ONU, and sending the OMCI message to the OLT.

8. The method according to claim 7, wherein said obtaining content message corresponding to each ONU comprises:

receiving the content message corresponding to each ONU sent by the VOLTMF deployed in the cloud server, wherein the VOLTMF checks an ONU list and distributes the content message to each ONU after receiving the content message and the ONU list corresponding to the content message sent by the OLT.

9. The method according to claim 7, wherein said obtaining content message corresponding to each ONU comprises:

receiving the content message and an ONU list corresponding to the content message sent by the OLT; and checking the ONU list and distributing the content message to each ONU.

10. The method according to claim 9, wherein method further comprises:

generating a backpressure message if ONU identification information in the ONU list cannot be recognized, wherein the backpressure message comprises the ONU identification information; and sending the backpressure message to the OLT.

11. A method for triggering a virtual Optical Network Unit Management and Control Interface (vOMCI) function from an Optical Line Terminal (OLT) to send Optical Management and Control Interface (OMCI) messages, which are applied to a VOLT Management Function (VOLTMF) deployed in a cloud server, the method comprising:

receiving a content message, generated by the OLT, that needs to be sent to an Optical Network Unit (ONU) based on OMCI protocol and an ONU list corresponding to the content message sent by the OLT, the content message being a time status message updated by a clock module in the OLT;

checking the ONU list, and distributing the content message to each ONU; and sending the content message corresponding to each ONU to the vOMCI function deployed in the cloud server.

* * * * *